United States Patent
Kawase (10) Patent No.: US 7,120,913 B2
(45) Date of Patent: Oct. 10, 2006

(54) PROCESSING EXECUTION APPARATUS HAVING DATA REFERENCE LIMITING FUNCTION

(75) Inventor: Yoshihiro Kawase, Chiryu (JP)

(73) Assignee: DENSO Corporation, Kariya (JP)

(*) Notice: Subject to any disclaimer, the term of this patent is extended or adjusted under 35 U.S.C. 154(b) by 641 days.

(21) Appl. No.: 10/115,019

(22) Filed: Apr. 4, 2002

(65) Prior Publication Data

US 2002/0147761 A1     Oct. 10, 2002

(30) Foreign Application Priority Data

Apr. 4, 2001     (JP)     ............... 2001-105875

(51) Int. Cl.
G06F 9/46     (2006.01)
G06F 15/00     (2006.01)
G06F 12/00     (2006.01)

(52) U.S. Cl. ............. 718/107; 719/318; 712/215; 711/173; 711/202

(58) Field of Classification Search ........... 719/310, 719/316, 318; 707/103, 8; 711/101, 147, 711/150, 173, 202; 718/100–108; 710/200; 712/215; 709/213; 713/202
See application file for complete search history.

(56) References Cited

U.S. PATENT DOCUMENTS

| | | | | |
|---|---|---|---|---|
| 4,325,120 A | * | 4/1982 | Colley et al. | 711/202 |
| 4,887,204 A | * | 12/1989 | Johnson et al. | 707/10 |
| 5,202,990 A | * | 4/1993 | Saikawa | 710/200 |
| 5,377,353 A | * | 12/1994 | Yamaguchi | 711/147 |
| 5,442,765 A | * | 8/1995 | Shiga | 707/8 |
| 5,469,567 A | * | 11/1995 | Okada | 707/8 |
| 5,590,326 A | * | 12/1996 | Manabe | 711/150 |
| 5,598,550 A | * | 1/1997 | Shen et al. | 711/146 |
| 5,613,122 A | * | 3/1997 | Burnard et al. | 713/1 |
| 5,727,214 A | * | 3/1998 | Allen | 719/318 |
| 5,787,490 A | * | 7/1998 | Ozawa | 711/173 |
| 5,813,016 A | * | 9/1998 | Sumimoto | 707/201 |
| 6,035,343 A | * | 3/2000 | Tsushima et al. | 719/318 |
| 6,195,744 B1 | * | 2/2001 | Favor et al. | 712/215 |
| 6,754,899 B1 | * | 6/2004 | Stoye | 718/104 |
| 7,032,226 B1 | * | 4/2006 | Nemirovsky et al. | 719/318 |
| 2002/0116469 A1 | * | 8/2002 | Okuyama | 709/213 |
| 2002/0174369 A1 | * | 11/2002 | Miyazaki et al. | 713/202 |

FOREIGN PATENT DOCUMENTS

| | | | |
|---|---|---|---|
| JP | 02405605 | * | 12/1990 |
| JP | 3168847 | | 7/1991 |
| JP | 4318635 | | 11/1992 |
| JP | 06-161788 | | 6/1994 |
| JP | 06257631 | * | 9/1994 |
| JP | 08-129492 | | 5/1996 |

(Continued)

*Primary Examiner*—Meng-Al T. An
*Assistant Examiner*—Jennifer N. To
(74) *Attorney, Agent, or Firm*—Nixon & Vanderhye P.C.

(57) ABSTRACT

A processing execution apparatus has an update management program and a reference limiting program. The update management program manages whether or not A- to C-data update programs are performing data update, and shows an update status indicating that update is being performed or a standby status indicating that update is not being performed. Then, the reference limiting program refers to the status of the update management program. If it is in the update status, the program does not notify an X-program including data reference processing of the received event. That is, execution of the X-program is controlled by notification/non-notification of the event. However, regarding a Y-program not including data reference processing, it directly operates in accordance with event.

12 Claims, 4 Drawing Sheets

FOREIGN PATENT DOCUMENTS

| | | |
|---|---|---|
| JP | 09-265405 | 10/1997 |
| JP | 09-330239 | 12/1997 |
| JP | 10293985 * | 10/1998 |
| JP | 2000-003287 * | 1/2000 |
| JP | 2000-3287 | 1/2000 |
| JP | 2000293416 | 10/2000 |

* cited by examiner

PROCESSING EXECUTION APPARATUS HAVING DATA REFERENCE LIMITING FUNCTION

CROSS REFERENCE TO RELATED APPLICATION

This application is based on and incorporates herein by reference Japanese Patent Application No. 2001-105875 (still pending) filed on Apr. 4, 2001.

FIELD OF THE INVENTION

The present invention relates to a processing execution apparatus, which realizes a predetermined function by performing interrupt processing between execution unit programs, and a processing program installed in the processing execution apparatus.

BACKGROUND OF THE INVENTION

In an electronic control unit (ECU) mounted on a vehicle, it is necessary in its control program to execute predetermined processing in a real-time manner for ensuring control response, safety and the like. For this purpose, programs are defined for tasks with priorities. More particularly, plural programs as execution units are separately defined as a program belonging to a high priority task, a program belonging to an intermediate priority task, a program belonging to a low priority task, and the like. By this definition, execution priority is substantially set for each program, and selection is performed in task units and executing the corresponding program, thereby a relatively high-priority processing program is executed prior to (interrupting) a relatively low-priority processing program, and real-time execution is ensured.

A problem occurs when a series of data requiring simultaneousness is handled in a program (lower-order program) which may be interrupted by another program (higher-order program). Such a case may occur, for example, when three data P, Q and R are updated in the lower-order program. At this time, if the higher-order program interrupts the lower-order program in a status where only the data P is updated and then the three data P, Q and R are referred to, only the data P is updated but the remaining data Q and R are not updated. Thus, a status occurs in which simultaneousness is unensured.

Accordingly, the interrupt processing by a higher-order program is inhibited during a period in which a series of data is handled by a lower-order program, such that the data is not referred to by the higher-order program in the middle of the handling of the series of data. It is noted that the inhibition of interrupt processing in the present specification includes inhibition of task selection based on the task level, i.e., inhibition of a task dispatch, as well as inhibition of all the interrupt on the computer level.

However, if interrupt processing is inhibited, execution of high-order program which does not refer to a series of data as a subject of operation, i.e., program which does not cause any program even if it is executed, is uniformly inhibited. Accordingly, especially when there is a large amount of series of data as a subject of operation, as time of interrupt inhibition increases, execution of processing highly requiring real-time execution is delayed. Thus, the possibility of ill effect on control performance increases.

For example, as a series of data handling, initialization of failure code (DTC) or freeze frame data (FFD) can be given as an example. As a vehicle control program especially requires high reliability, the reliability is improved by providing the program with a self diagnostic function. That is, operation statuses of computer and sensors are automatically checked at appropriate periods, and upon occurrence of failure, the DTC as failure information or FFD as vehicle information upon occurrence of failure is stored in a nonvolatile memory such that a repair person or the like can obtain the content of the failure.

Regarding this diagnostic processing, it is required to realize service called "mode 04" for initializing stored DTC or FFD by legal regulation (OBD2). To realize this service, parameters of logic to perform failure detection must be initialized at the same time of initialization of the DTC or FFD stored in the nonvolatile memory, since the operation of the system becomes unstable if there is no consistency between the information and the parameters.

However, the number of failure detection subjects is presently about 200, and further it is increasing. Accordingly, an enormous number of data are subjects of initialization. In such a case, especially time of interrupt inhibition increases, and execution of processing highly requiring real-time execution is delayed. As a result, the possibility of unwanted effect on control performance increases.

SUMMARY OF THE INVENTION

The present invention has an object to ensure simultaneousness of series of data as a subject of handling, and further reduce delay of processing highly requiring real-time execution as much as possible.

According to the present invention, a processing execution apparatus has a processing program defined as segments. That is, the program is defined in function units, for example. A predetermined function is realized by performing interrupt processing between execution unit programs. The interrupt processing means that, in the middle of execution of some programs, another program is executed with priority. Accordingly, it includes interrupt by time-division processing as well as above interrupt by task dispatch. The execution unit program includes the data update program. The data update program updates a series of data requiring simultaneousness upon occurrence of data update request.

The present invention is characterized in that the processing program has an update management program and a reference limiting program. The update management program notifies the data update program of the update request and moves to the update status. Further, on the other hand, the update management program determines the completion of update of the series of data by the data update program, by the update completion notification from the data update program, and moves to the standby status. That is, the update management program manages update status by the data update program. Then, if the update management program is in the update status, the reference limiting program inhibits reference to the series of data by the other program.

That is, interrupt by the higher-order program is not uniformly inhibited, but the update management program to indicate whether data update is performed or not is prepared, and reference is individually inhibited based on the status of the update management program. Thus, while a series of data is updated, as reference to the data is inhibited, simultaneousness of the series of data as a subject of operation can be ensured. Then, as execution of a program which does not refer to the data is not inhibited, delay of processing highly requiring real-time execution can be reduced.

As a method for inhibiting reference, the reference limiting program inhibits reference processing to the series of data by the other program. In this case, the reference limiting program is executed prior to the reference processing by the other program. Accordingly, it may be defined as a part of the other program. Further, it may be defined as a sub program called from the other program.

However, there may be, for instance, tens or hundreds of other programs including the reference processing to a series of data. In such a case, it is troublesome to define the reference limiting program itself or a step to call the reference limiting program for each program.

Then, it is preferable that the reference limiting program inhibits execution of the other program including the reference processing to the data as a subject of operation. In this case, the number of reference limiting programs may be one as a program to control execution of plural other programs. In this manner, the construction of processing program can be simplified, which is convenient for a programmer. More particularly, based on an event as an execution condition for the other program, the status of the update management program is referred to, and the execution of the other program is controlled. That is, a fundamental trigger as the execution condition for the other program is shut off in accordance with the status of the update management program. By this arrangement, the reference limiting program is independent of other execution unit program, and reusability of the processing program is improved.

It is noted that from a viewpoint of reusability, the processing program is made by object-oriented design, and the execution unit program is realized as a reusable object. At this time, the update management program and the reference limiting program are respectively realized as the update management object and the reference limiting object. Further, the update management program indicates the status related to update. However, if it is realized as the update management object, the update status or standby status may be indicated as data (attribute) of the object.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
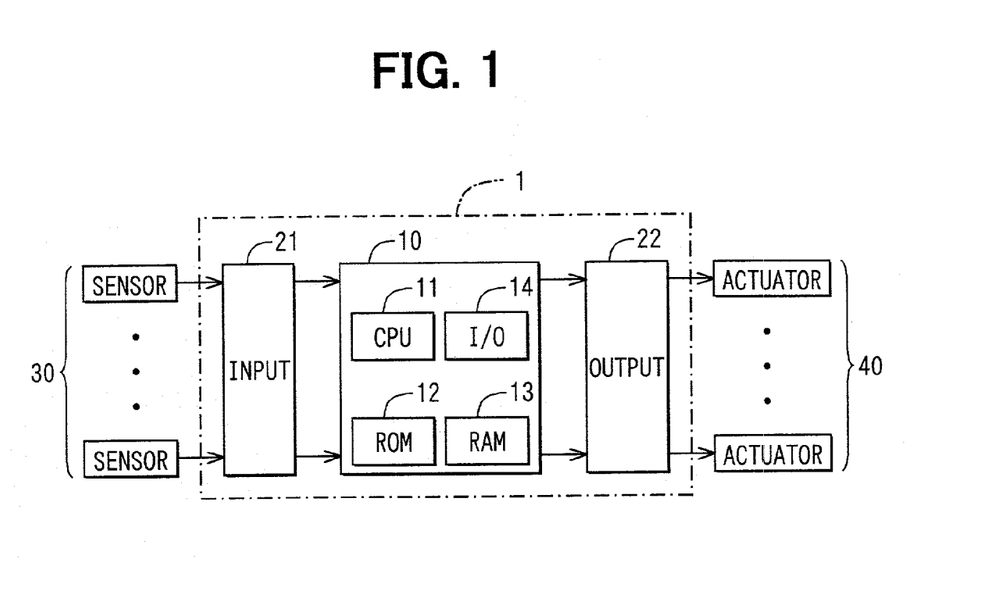
FIG. 1 is a block diagram showing an engine control unit according to a first embodiment of the present invention.

Referring first to FIG. 1, an engine control unit (ECU) 1 is provided as a processing execution apparatus to control an internal combustion engine mounted on a vehicle.

The ECU 1 has an input circuit 21 which inputs signals from various sensors 30 for detecting engine operating conditions, such as a turning angle sensor which outputs a pulse signal each time an engine crankshaft turns by a predetermined angle, a reference position sensor which outputs a pulse signal each time a piston of particular cylinder of the engine comes to a predetermined position (e.g., top dead center TDC), a. coolant temperature sensor which detects the temperature of engine cooling water, and an oxygen concentration sensor which measures the concentration of oxygen and performs waveform shaping and A/D conversion. The ECU 1 also has a microcomputer 10 which performs various processing to control the engine based on the sensor signals from the input circuit 21, and an output circuit 22 which drives actuators 40 for an injector (fuel injection device) and an igniter (ignition device) attached to the engine.

The microcomputer 10 has a well-known CPU 11 which performs various programs, a ROM 12 for storing the various programs executed by the CPU 11, a RAM 13 for storing the result of calculation by the CPU 11, or the like, an I/O 14 for signal transmission with the input circuit 21 and the output circuit 22, various registers, free run counters and the like (not shown).

The ECU 1 performs engine control processing to drive the actuators 40 connected to the output circuit 22, based on the signals inputted via the input circuit 21 from the various sensors 30.

Figure 2:
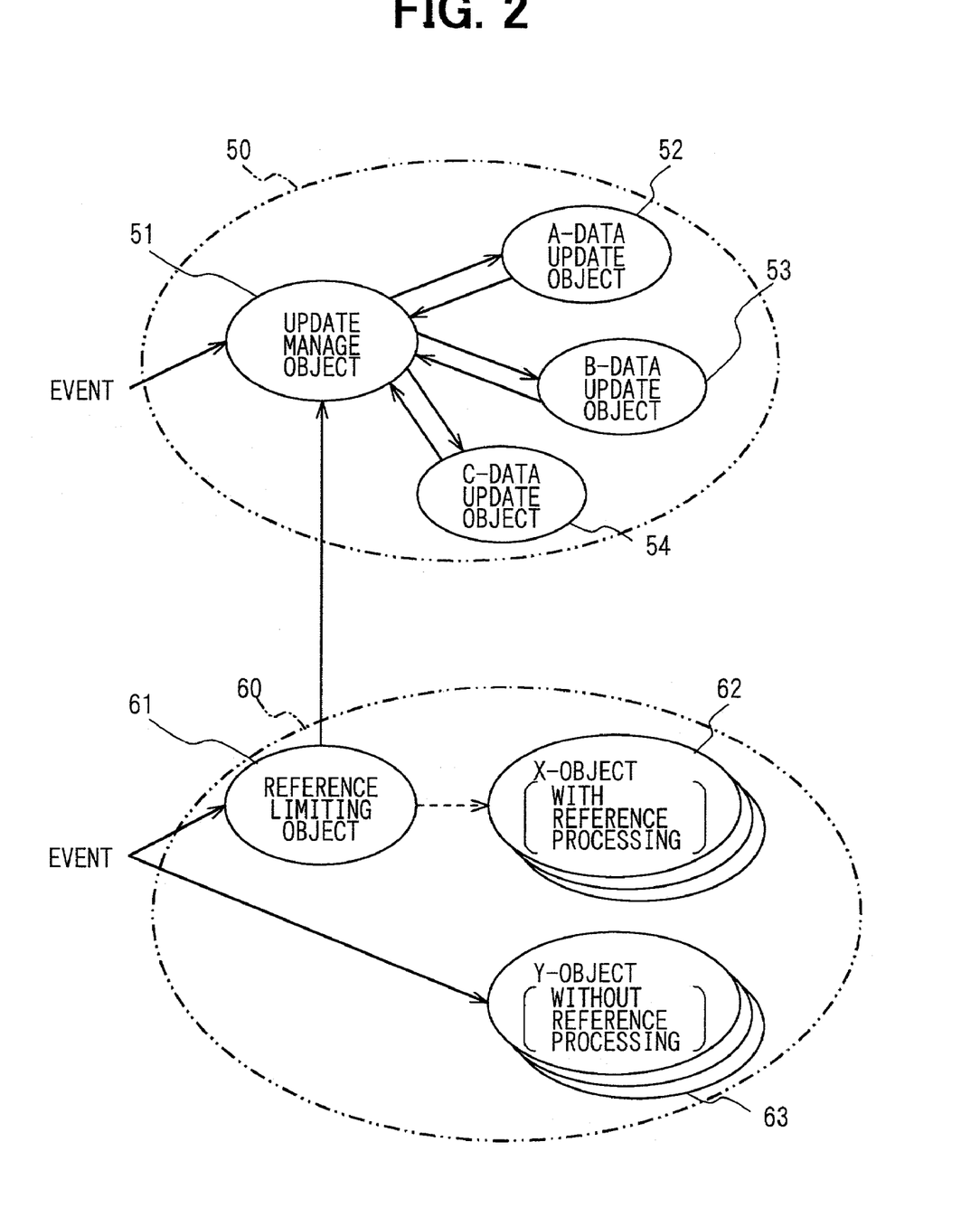
FIG. 2 is an explanatory diagram showing an engine control program executed by the engine control unit shown in FIG. 1.

An engine control program of the ECU 1 is stored in the ROM 12 as described above, and is made by object-oriented design. The engine control program thus corresponds to the processing program. The processing program comprises objects as execution unit programs, and is joined and operated by message communication among these objects. Each object belongs to any of a low priority task, an intermediate priority task or a high priority task. Then, upon occurrence of an event, the task is started by RTOS, and the object corresponding to the event operates. At this time, a relatively high priority task is started prior to a relatively low priority task. By this arrangement, interrupt processing is realized among the objects, and an object highly requiring real-time execution is executed with priority.

The control program includes a low priority task 50 and a high priority task 60. The low priority task 50 includes an update management object 51 and update objects 52, 53 and 54 for three data A, B and C. On the other hand, the high priority task 60 includes a reference limiting object 61, an X-object 62 and a Y-object 63.

The A- to C-data update objects 52 to 54 belonging to the low priority task 50 respectively have one or plural data. When a data update request is made, the objects perform data update. It is noted that the data as subjects of update by the A- to C-data update objects 52 to 54 require simultaneousness upon referencing by the task 60.

The X-object 62 belonging to the high priority task 60 is a set of objects with processing of referencing (reference processing) to the data held by the A- to C-data update objects 52 to 54. The Y-object 63 is a set of objects without reference processing to these data. That is, the execution unit objects to realize the various functions belonging to the high priority task 60 are classified into two groups based on presence/absence of reference to the data held in the A- to C-data update objects 52 to 54.

If the X-object 62 interrupts and operates before data update has been completed in all the A- to C-data update objects 52 to 54, the simultaneousness of referencing to the data cannot be ensured. For example, if the X-object 62 interrupts upon completion of data update only by the A-data update object 52, the data held in the B- and C-data update objects 53 and 54 include unupdated old data.

Figure 3A:
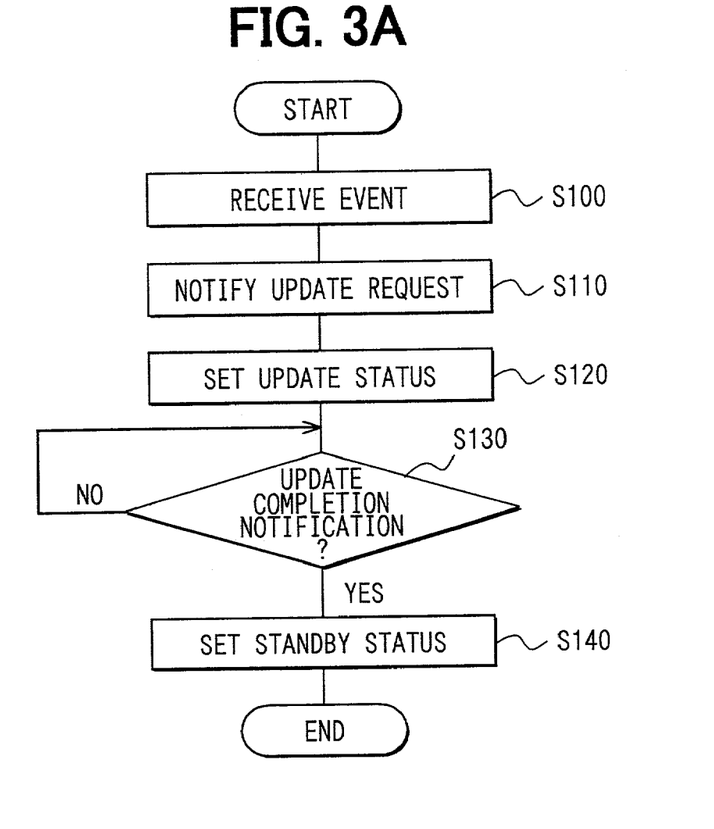
FIG. 3A is a flowchart showing update management processing by an update management object in the engine control program.
Figure 4:
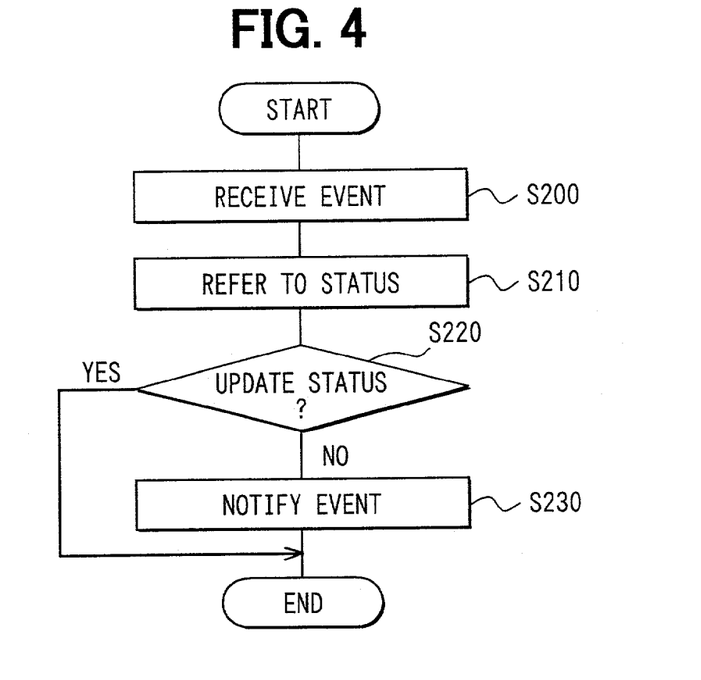
FIG. 4 is a flowchart showing reference limiting processing by a reference limiting object in the engine control program.

Therefore, in this embodiment, the update management object 51 is prepared to determine whether or not data update is currently performed by the A- to C-data update objects 52 to 54, and the reference limiting object 61 refers to the status of the update management object 51 and controls execution of the X-object 62. Details of the update management object 51 and the reference limiting object 61 are shown in FIG. 3A and FIG. 4, respectively.

First, at initial step (S) 100, an event is received. The event means an operation trigger signal, and it may be, e.g., a signal inputted via the above input circuit 21 into the microcomputer 10, or it may be a signal based on an internal counter of the microcomputer 10. Further, it may be an event from an external tool.

At the next S110, the A- to C-data update objects 52 to 54 are notified of data update request. At the next S120, a variable status is set to an update status. The variable status is prepared as data of the update management object 51 and is set to a standby status upon initialization.

By the above update request at S110, the A- to C-data update objects 52 to 54 perform data update processing. When the data update is completed, the objects 52 to 54 perform update completion notification. Accordingly, at the subsequent S130, it is determined whether or not the update completion notification has been issued from all the A- to C-data update objects 52 to 54. If it is determined that the update completion notification has been issued (S130: YES), the variable status is set to the standby status at S140. Thereafter, the update management processing ends. On the other hand, if the update completion notification has not been issued (S130: NO), the determination processing is repeated.

Figure 3B:
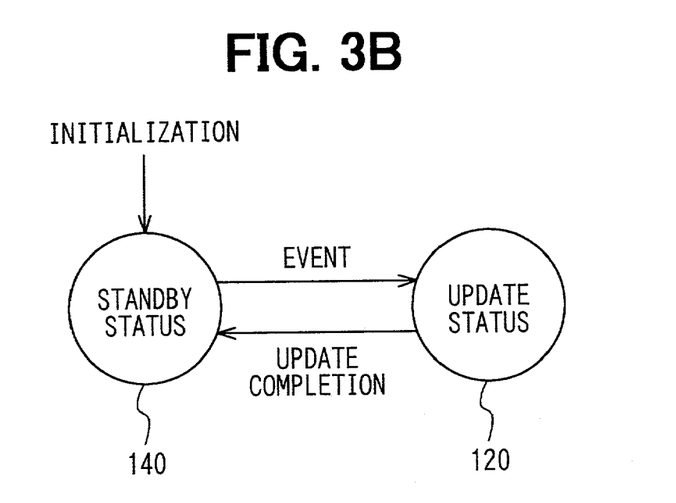
FIG. 3B is an explanatory diagram showing a status transition of the update management object.

By the above update management processing, the update management object 51 sets the variable status to the update status if data update is being performed. On the other hand, if the data update has been completed, the object 51 sets the variable status to the standby status, thereby performs so-called status transition. FIG. 3B is an explanatory diagram of this processing. That is, first, the status is a standby status 140 after the initialization, then by acquisition of event, the update request is notified and the status moves to an update status 120. Then, if the completion of update is determined, the status moves to the standby status 140 again.

In the reference limiting processing of the object 61, as shown in FIG. 4, at the initial S200, an event as an operation status for the X-object 62 is obtained. At the subsequent S210, the status of the update management object 51 is referred to. More particularly, a message is outputted to the update management object 51, and the variable status is referred to.

At S220, it is determined based on the result of reference whether or not the status is the update status. If it is determined that the status is the update status (S220: YES), processing at S230 is not performed but the present reference limiting processing ends. In this case, the X-object 62 corresponding to the event is not performed. On the other hand, if it is determined that the status is not the update status (S220: NO), that is, if it is determined that the status is the standby status, the event is notified at step S230. Thereafter, the present reference limiting processing ends. In this case, the X-object 62 corresponding to the event is performed.

In the first embodiment, the update management object 51 and the reference limiting object 61 are provided. The update management object 51 manages whether the A- to C-data update objects 52 to 54 are performing data update with the value of the variable status (S120, S140 in FIG. 3). Then, the reference limiting object 61 refers to the status of the update management object 51, i.e., refers to the value of the variable status (S210 in FIG. 4). If the status is the update status (S220: YES), the X-object 62 is not notified of received event. By this processing, the X-object 62 including data reference processing is not performed during the data update. As a result, the simultaneousness can be ensured upon reference to the series of data as a subject of update by the A- to C-data update objects 52 to 54. On the other hand, regarding the Y-object 63 not including the data reference processing, as it directly operates depending on event, delay of processing highly requiring real-time execution can be reduced as much as possible (FIG. 2).

Further, in the first embodiment, the reference limiting object 61 receives the event as the execution condition for the X-object 62 (S200 in FIG. 4), refers to the status of the update management object 51 (S210), and controls the operation of the X-object 62 in accordance with notification/non-notification of the event (S220, S230). That is, the fundamental trigger as an execution condition is shut off in accordance with the status of the update management object 51. By this processing, even if plural objects including data reference processing, i.e., X-object 62 exists, they can be handled by only one reference limiting object 61. Further, the reference limiting object 61 is independent of the X-object 62 and reusability is improved.

Furthermore, in the first embodiment, as the entire engine control program is made by object-oriented design, and the update management object 51 and the A- to C-data update objects 52 to 54 are joined by processing-independent and formal message communication, high independency can be attained, and the reusability of the engine control program can be improved.

(Second Embodiment)

In the first embodiment, the update management object 51 notifies the respective A- to C-data update objects 52 to 54 of the update request, and based on the update completion notification from the respective data update objects 52 to 54, determines the completion of the entire update.

Figure 5:
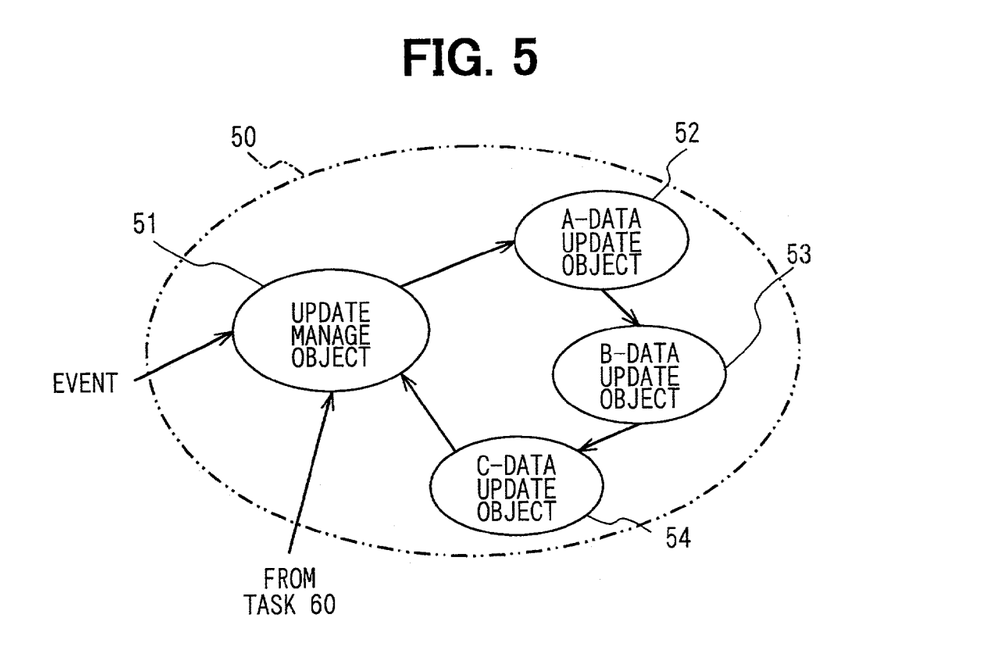
FIG. 5 is an explanatory diagram of joining of the data update objects according to a second embodiment of the present invention.

However, it may be arranged such that, as shown in FIG. 5, first, the update management object 51 issues the update request to the A-data update object 52, next, the A-data update object 52 issues the update request to the B-data update object 53. Further, the B- data update object issues the update request to the C-data update object 54. In this case, the update management object 51 determines the entire update completion based on the completion notification from the C-data update object 54.

(Third Embodiment)

In the above embodiments, the reference limiting object 61 obtains an event, refers to the status of the update management object 51, and determines notification/non-notification of the event.

Figure 6:
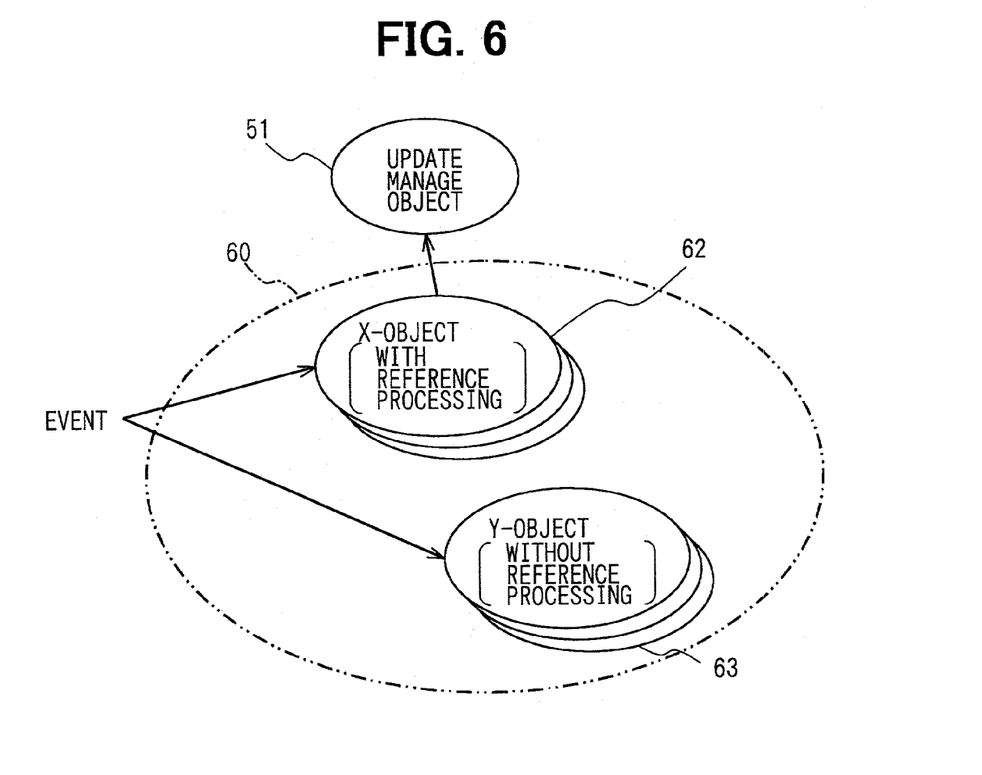
FIG. 6 is an explanatory diagram showing inhibition of reference processing according to a third embodiment of the present invention.

However, as shown in FIG. 6, each X-object 62 may be constructed to refer to the status of the update management object 51 and determine whether or not the reference processing is to be performed. At this time, there is no problem if the number of the X-objects 62 is comparatively small. However, the number of objects may be tens or hundreds. In such a case, as in the case of the above embodiments, it is preferable that the reference limiting object 61 is provided independent of the X-object 62, since it is unnecessary to define the processing for reference limitation and a step for calling the processing for the reference limitation in each of the respective X-objects 62.

(Fourth Embodiment)

Further, in the above embodiments, all the data to be updated by the A- to C-data update objects 52 to 54 require simultaneousness. On the other hand, simultaneousness may be required between particular data among the data as subjects of update. In this case, it may be arranged such that the update management object 51 determines the content of the event and notifies only the corresponding one(s) of the A- to C-data update objects 52 to 54 of the update request.

The present invention is not limited to the above disclosed embodiments but can be implemented in various forms within a scope not departing from the subject matter of the present invention.

What is claimed is:

1. A processing execution apparatus comprising a storage medium for storing a processing program defined in segments for executing a predetermined function by performing interrupt processing between execution unit programs, each of the execution unit programs includes a data update program which updates a series of data requiring simultaneousness of referencing when a data update request is made, wherein the processing program has:

an update management program which, upon execution by the processing execution apparatus, notifies the data update program of the update request and moves to an update status when receiving an event as an execution condition for the data update program, and determines completion of update of the series of data by the data update program, by an update completion notification from the data update program, and moves to a standby status; and a reference limiting program which, upon execution by the processing execution apparatus, inhibits execution of each program including reference processing of the series of data requiring simultaneousness of referencing in another execution unit program except the data update program if the update management program is in the update status;

wherein another execution unit program includes a first program which executes the reference processing of the series of data and a second program which does not execute the reference processing, and wherein the first program receives, upon execution by the processing execution apparatus, an event through the reference limiting program to start its execution and the second program receives, upon execution by the processing execution apparatus, the event not through the reference limiting program; and the second program executes its operation irrespective of the status of the update management program when the event is received.

2. The processing execution apparatus as in claim 1, wherein the reference limiting program is defined as a part of another execution unit program and is executed before the another execution unit program executes the reference processing of the series of data.

3. The processing execution apparatus as in claim 1, wherein the reference limiting program, upon execution by the processing execution apparatus, refers to a status of the update management program when receiving an event as an execution condition of the each program including the reference processing of the series of data and the reference limiting program inhibits execution of the each program including the reference processing of the series of data if the update management program is in the update status.

4. The processing execution apparatus as in claim 1, wherein the processing program is made by an object-oriented programming, and wherein the execution unit program is realized as a reusable object.

5. The processing execution apparatus as in claim 4, wherein the update management program and the reference limiting program are realized as an update management object and a reference limiting object, respectively.

6. The processing execution apparatus as in claim 5, wherein the update management object indicates the update status and the standby status as data of the object.

7. The processing execution apparatus as in claim 1, wherein the reference limiting program belongs to a task having a higher priority than a task to which the update management program belongs.

8. The processing execution apparatus as in claim 1, wherein the reference limiting program issues the event to the first program when the update management program has been moved to the standby status.

9. A processing program product installed, used and executable in a processing execution apparatus for executing a predetermined function by performing interrupt processing between execution unit programs, which include a data update program which updates a series of data requiring simultaneousness of referencing when a data update request is made, the processing program product comprising:

an update management program means for causing the processing execution apparatus to notify the data update program of the update request and move to an update status when receiving an event as an execution condition for the data update program, and determine completion of update of the series of data by the data update program, by an update completion notification from the data update program, and move to a standby status; and a reference limiting program means for causing the processing execution apparatus to inhibit execution of each program including the reference processing of the series of data requiring simultaneousness of referencing in another execution unit program except the data update program if the update management program is in the update status;

wherein another execution unit program includes a first program means which executes the reference processing of the series of data and a second program means which does not execute the reference processing, and wherein the first program means receives, upon execution by the processing execution apparatus, an event through the reference limiting program means to start its execution and the second program means receives, upon execution by the processing execution apparatus, the event not through the reference limiting program means; and the second program means is executed irrespective of whether the status of the update management program means is in the standby status or the update status.

10. A processing program as in claim 9, wherein the reference limiting program means refers to a status of the update management program means when receiving an event as an execution condition for the each program including the reference processing of the series of data, and if the update management program means is in the update status, the reference limiting program inhibits execution of the each program means including the reference processing of the series of data.

11. A recording medium readable by a computer, tangibly embodying a processing program of instructions executable by the computer to perform method steps, the method steps comprising:

executing an update management program, upon receipt of an event, to cause at least one data update program to update a series of data requiring simultaneousness of referencing, to provide a status of the update management program as being an update state when the data update program is updating the series of data, and to provide the status of the update management program as being a standby state when the update of the series of data by the data update program is completed; and executing, in response to a received event, a reference limiting program which refers to the status of the update management program so that the reference limiting program notifies a reference processing program to allow the reference processing program to refer to the series of data when the status of the update management program is in the standby state, and limits notification to the reference processing program to limit the reference processing program from referring to the series of data when the status of the update management program is in the update state;

wherein the reference processing program executes reference processing, upon execution of the computer, of the series of data in response to the event received through the reference limiting program to start its execution;

a processing program without reference processing receives, upon execution by the computer, the event not through the reference limiting program; and wherein the processing program without reference processing is executed irrespective of whether the status of the update management program is in the standby state or the update state.

12. A computer-implemented method of controlling execution of a processing program by a computer system, which has a low priority task program and a high priority task program executed by interrupting an execution of the low priority task program, the low priority task program including a plurality of data update programs for respectively updating different data that needs be updated simultaneously and an update management program for managing updating of data of the data update programs in response to an event input, and the high priority task program including a reference processing program for referencing to data of the data update programs and a reference limiting program for controlling referencing of the reference processing program to the data of the data update programs, the method comprising:

executing, in response to a first event, the update management program via the computer system to cause the data update programs to update respective data therein, and to change a status thereof from an update state to a standby state when update of all data by the data update programs has been completed; and executing, in response to a second event, the reference limiting program via the computer system to refer to a state of the update management program, wherein the reference limiting program, upon execution by the computer system, notifies the second event to the reference processing program to allow the reference processing program to refer to the data of the data update program when the status of the update management program is the standby state, and limits a notification of the second event to the reference processing program to limit the reference processing program to refer to the data of the data update program when the status of the update management program is the update state;

a program without reference processing receives, upon execution by the computer system, the second event not through notification by the reference limiting program; and the program without reference processing is executed via the computer system in response to its receipt of the second event irrespective of whether the status of the update management program is in the standby state or the update state.

* * * * *